United States Patent [19]

Bononi

[11] Patent Number: 4,695,140
[45] Date of Patent: Sep. 22, 1987

[54] PAD

[76] Inventor: Walter H. Bononi, Fellbach-Schmiden, Fed. Rep. of Germany

[21] Appl. No.: 564,709

[22] Filed: Dec. 23, 1983

[30] Foreign Application Priority Data

Dec. 28, 1982 [DE] Fed. Rep. of Germany ............ 82366322[U]

[51] Int. Cl.⁴ ............... G02C 1/00; G02C 5/02
[52] U.S. Cl. ............................ 351/139; 351/78; 351/132
[58] Field of Search ............ 351/136, 137, 138, 139, 351/132, 78, 79, 80, 81

[56] References Cited

U.S. PATENT DOCUMENTS

| 4,235,530 | 11/1980 | Stuhrer | 351/136 |
| 4,272,166 | 6/1981 | Bononi | 351/122 |
| 4,293,201 | 10/1981 | Fokuda et al. | 351/139 X |

FOREIGN PATENT DOCUMENTS

| 2558122 | 7/1977 | Fed. Rep. of Germany | 351/136 |
| 2404240 | 5/1979 | France | 351/136 |
| 5624315 | 3/1981 | Japan | 351/136 |

Primary Examiner—Rodney B. Bovernick

[57] ABSTRACT

A pad is fastened angularly movable to pad levers of spectacle frames. The pad has a kidney-shaped pad body, which has a skin contact surface merging, with circumferential radii, in a rear surface which is spaced from the skin contact surface. The pad is cast around an anchoring plate, which has an elongated contour in the longitudinal extension of the pad body and is substantially thinner than the pad body. A finger projects perpendicularly from the anchoring plate and passes through the rear surface of the pad body. In its free end zone, the finger has a cross hole with extends transversely to the longitudinal extension of the pad body. The anchoring plate and the finger are of the same material. The pad body consists of glass-clear silicone rubber having a Shore-D hardness of 10–30 according to DIN 53 305. The anchoring plate consists of a transparent plastic material that is harder than the pad body and is a lattice-work of small rods which enclose openwork.

7 Claims, 2 Drawing Figures

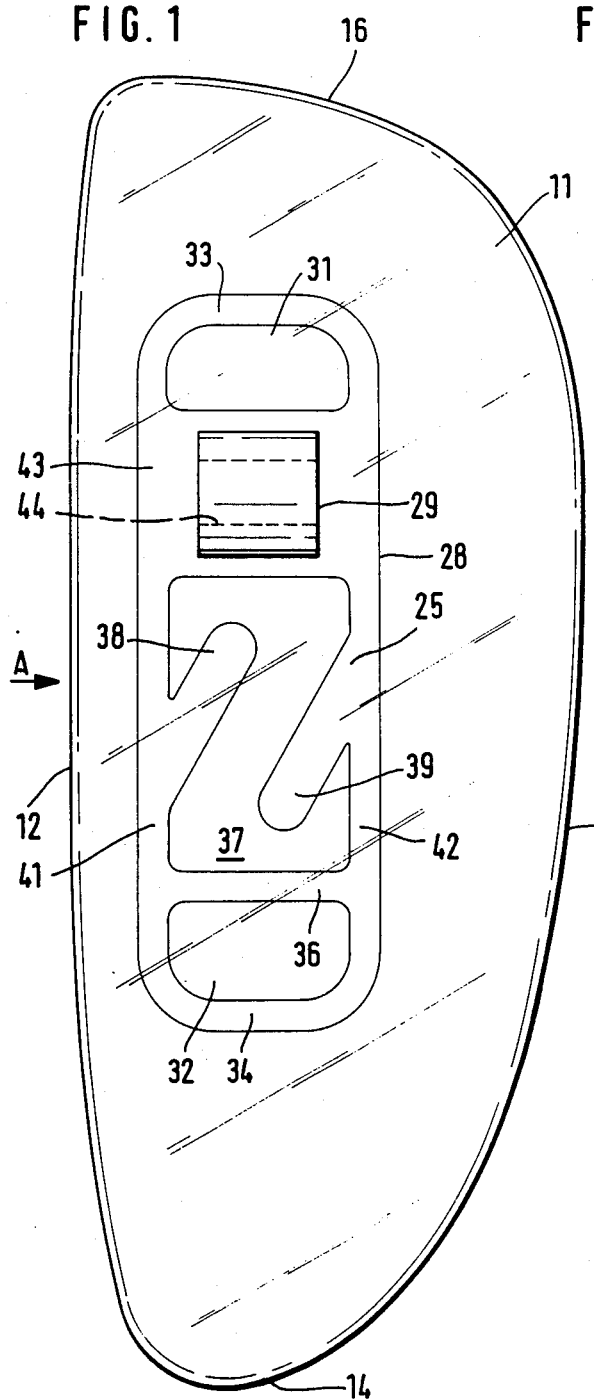
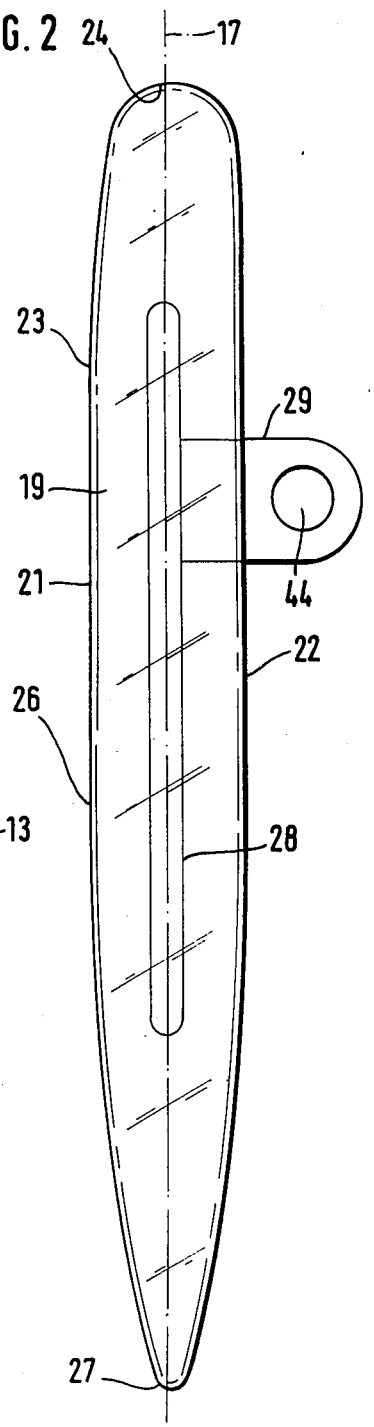

PAD

The invention relates to a pad that is fastened to move angularly to pad levers.

BACKGROUND OF THE INVENTION

It has become known from U.S. Pat. No. 4,243,306 to use for such pads materials within the hardness range of 10-30 Shore-D, measured according to DIN 53 505. It is furthermore known therefrom that silicone rubber is suitable for this purpose. DIN 53505 is entitled "Testing of Elastomers; Shore A and D Hardness Testing." It describes a method of determining the hardness of elastomers. In relevant part, DIN 53505 states:

The Shore hardness means the resistance to penetration by a body of defined shape under a defined compressive load. The hardness scale covers the range from 0 to 100, 0 representing the least and 100 the greatest hardness.

The method and apparatus for performing Shore hardness testing and measurement also are described in American Society of Testing Materials (ASTM) Standard D 2240-85, entitled "Standard Test Method for Rubber Property—Durometer Hardness.

In principle, there are in existence different kinds of pads, viz.:

(a) Pads which are fastened to a pad ever by means of retention pins, these pads being supported not only by the retention pins, but also by the pad lever which, for its part, carries the retention pins and which extends along a step in the pad as shown, for example, in FIGS. 3 and 4 of U.S. Pat. No. 4,243,306.

(b) Another kind of pad comprises, cast-in, a sleeve in a somewhat harder material and provided with a blind hole, into which the pad lever is inserted. U.S. Pat. No. 4,235,530 shows such a solution.

(c) Another kind of pad is kidney-shaped, consisting of an elastic pad base material and comprises, cast-in, a flat anchoring plate in a hard material, for example metal. This plate is connected to a finger which projects from the surface which is directed away from the skin contact surface of the pad. The finger has a cross bore and forms part of a semicardanic or fully cardanic suspension on the pad lever. Such a solution is known from DE OS 27 50 910.

(d) Finally, there are in existence further pads which are connected directly to the spectacle frame, as known from U.S. Pat. No. 4,142,784.

OBJECT AND STATEMENT OF THE INVENTION

It is the object of the invention to indicate a pad of the (c) type which consists of a soft material, such as is known from U.S. Pat. No. 4,243,306, and which comprises an anchoring plate which is undetachably connected to this material and which makes it possible to collect the forces introduced into the soft material from a relatively large surface and then to introduce these forces into the reception device.

According to the invention, this problem is solved by the following features:

(a) The pad body consists of glass-clear silicone rubber having a Shore-D hardness of 10-30 according to DIN 53 305; and (b) The anchoring plate consists of a transparent plastic material that is harder than the pad body and is a lattice-work of small rods which enclose open-work.

Advantageously, the invention includes the following additional features:

(a) The anchoring plate extends further into the tip of the pad body than into the flat part thereof. Due to the features, the bearing forces are introduced into the anchoring plate from the tip of the pad, so that the pad is not divided into a supported upper zone and a completely unsupported lower zone, which would result in a kink in the zone transition during wear.

(b) The distance of the front edge of the anchoring plate from the front edge of the pad body is shorter than that of the rear edge thereof from the rear edge of the pad body. Due to the features, one ensures a satisfactory anchoring of the anchoring plate in the pad body and allows the area of this plate to be made relatively large without stiffening the pad in a disturbing matter.

(c) The area of the open-work amounts to a proportion of the area of the anchoring plate that is in excess of 30%. Due to the features, one ensures that the pad body adapts more to the nose contour of the person wearing the spectacles in the zone of its rear edge than in the front zone, which improves the wear characteristics of the spectacle frame.

(d) The stiffness of the anchoring plate in relation to the stiffness of the pad body is negligible. The features ensure that the anchoring plates does not disturbingly affect the advantageous characteristics of the pad body in its zone.

(e) The length of the anchoring plate is several times greater than its width. Due to the features, one obtains a sufficient anchoring area and takes into account that, during wear of the spectacles, those forces which seek to displace the anchoring plate relative to the pad body extend in the longitudinal direction.

(f) The thickness of the anchoring plate is between 1.2 and 0.5 mm, and the total thickness of the pad is between 2 to 3.5 mm. The thickness of the anchoring plate is 0.7 mm and the total thicknes of the pad is 2.7 mm. A dimensioning according to the features has been ell proven in practice.

DESCRIPTION OF THE DRAWING

The invention will now be described with the aid of preferred exemplified embodiments. In the drawing:

FIG. 1 shows the rear view of a pad, scaled up by the factor 12, and

FIG. 2 shows a view according to the arrow A in FIG. 1.

DETAILED DESCRIPTION

In the top view of FIG. 1, a pad body 11 has that shape which is called a "kidney shape" in pad technology. When worn, the substantially straight edge 12 is to the front. The edge 13, which is slightly curved, is at the rear, the lower tongue-shaped edge 14 points downwardly and the upper edge 16, which has a medium-sized curvature, points upwardly. The pad body consists of silicone rubber having a Shore-D hardness of 10-12. In the side view of FIG. 2, one sees that the pad body 11, on its edges, runs up to the centre plane 17. In a central zone 19, the front 21 and the rear 22 extend approximately parallel to each other. Towards the top, there occurs as from 23 a small taper and right at the top there is present a radius 24 which practically corresponds to the distance between the front 21 and the rear 22. The zone 29 ends approximately at half the height of the pad body 11, and as from 26 this latter then tapers gradually and, becoming thinner and thinner, extends to a tip 27 which, as shown in FIG. 2, terminates fairly thinly.

The above-mentioned Shore-D hardness of 10–12 has been measured on the pad. This softenss, together with the configuration, allows the pad body 11 to cling in an optimum manner even to curved nose portions or to a very soft skin.

According to FIG. 1, it would appear that the centroid of the pad body 11 is at 27. Considerably displaced to the left relative thereto, according to FIG. 1, there is provided in the pad body 11 an anchoring plate 28. This plate consists of an injection-moulded acetate plastics material and is consequently substantially harder than the pad body 11. Both the anchoring plate 28 and the pad body 11 are glass clear, for which reason one sees the anchoring plate 28 only at refraction points from the outside. This is furthermore due to the fact that the pad body 11 has been cast around the anchoring plate 28 and partly around the finger 29 which is integral with the anchoring plate 28. The anchoring plate 28 is however only 0.7 mm thick and is weakened in a manner that will be described hereinafter so that it practically does not exert any restoring force whatsoever on the pad body. The anchoring plate is 12 mm long, 0.7 mm thick and 4.2 mm wide. As described below, the anchor plate comprises a lattice of openings and small rods which form an ajoure or openwork design. A curved opening 31 is provided at the top and an opening 32 of the same kind is provided at the bottom. There are thus left handle-shaped small rods 33, 34. Above the opening 32 there is provided a small cross rod 36. Above the small cross rod 36 there follows a larger, approximately rectangular opening 37, into which there project, inclinedly and parallel to each other, two small rods 38, 39 which are connected at one of their ends to outwardly located small longitudinal rods 41, 42.

Between the opening 37 and the opening 31 there is provided a lamina 43 which is rectangular horizontally. From this lamina there extends upwardly the finger 29. This finger is embedded in the pad body 11 over the major part of its length and projects, with an eye provided with a cross hole 44, beyond the rear 22.

Considered from the front 21, the pad body 11 behaves, despite the anchoring plate 28, as if this plate were virtually not present, so that the entire material of the pad body 11 contributes to the softness utilisation, and this includes that which according to FIG. 2 is located to the right of the anchoring plate 28.

I claim:

1. A pad adapted to be fastened angularly movable to pad levers of spectacle frames comprising:
   (a) a kidney-shaped pad body, which has a skin contact surface merging, with circumferential radii, in a rear surface which is spaced from the skin contact surface,
   (b) an anchoring plate, having a plane around which the pad body has been cast and which has an elongated contour in the longitudinal extension of the pad body and is substantially thinner than the pad body,
   (c) a finger having a free end zone which projects perpendicularly from the anchoring plate and which passes through the rear surface of the pad body and in its free end zone has a cross hole which extends transversely to the longitudinal extension of the pad body, the anchoring plate and the finger being of the same material,
   (d) and the improvement wherein:
      (1) The pad body consists of glass-clear silicone rubber having Shore-D hardness of 10–30 according to DIN 53 305, and
      (2) The anchoring plate consists of a transparent plastic material that is harder than the pad body; the length of the anchoring plate is several times greater than its width; and the elongated contour of the anchoring plate extends perpendicularly and substantially beyond the finger and comprises a lattice-work of openings and small rods in an ajoure arrangement that facilitates flexure of the anchoring plate together with the pad body while providing a sufficient anchoring area to secure the anchoring plate substanially undetachably in the pad against forces extending longitudinally substantially over the anchoring plate in a direction substantially parallel to the finger.

2. A pad as claimed in claim 1, wherein the anchoring plate extends further into the tip of the pad body than into the flat part thereof.

3. A pad as claimed in claim 2, wherein the distance of the front edge of the anchoring plate from the front edge of the pad body is shorter than that of the rear edge thereof from the rear edge of the pad body.

4. A pad as claimed in claim 1, wherein the ajoure area amounts to a proportion of the area of the anchoring plate that is in excess of 30%.

5. A pad as claimed in claim 1, wherein the anchoring plate is designed and arranged within the pad so that the stiffness of the anchoring plate has a negligible affect upon the softness of the pad body against a wearer's skin.

6. A pad as claimed in claim 1, wherein the thickness of the anchoring plate is between 1.2 and 0.5 mm, and the total thickness of the pad is between 2 to 3.5 mm.

7. A pad as claimed in claim 6, wherein the thickness of the anchoring plate is 0.7 mm and the total thickness of the pad is 2.7 mm.

* * * * *